Patented Feb. 22, 1944

2,342,173

UNITED STATES PATENT OFFICE 2,342,173

HALOGENATING MALEIC ANHYDRIDE

Paul H. Wise and Charles R. Milone, Akron, Ohio, assignors to Wingfoot Corporation, Akron, Ohio, a corporation of Delaware No Drawing. Application August 25, 1942, Serial No. 456,092

10 Claims. (Cl. 260—342.6)

This invention relates to the halogenation of maleic anhydride to produce a dihalo succinic anhydride, such as dichloro or dibromo succinic anhydride, and the dehydrohalogenation of the dihalo succinic anhydride to produce a monohalo maleic anhydride. Aluminum chloride is used to catalyze both the halogenation and the dehydrohalogenation. The process may be regulated so that the dehydrohalogenation follows substantially complete halogenation, or both the halogenation and dehydrohalogenation may take place simultaneously.

According to this reaction the halogen, which is preferably chlorine although bromine may be used, is brought into contact with molten maleic anhydride which contains an anhydrous aluminum halide, such as the chloride or bromide, as a catalyst. The amount of the aluminum halide may vary, but in general from about 1 to 5 per cent on the weight of the maleic anhydride will be employed. The mixture is preferably agitated to produce intimate contact between the reactants.

The temperature is controlled to produce a desired product. For the production of monohalo maleic anhydride, such as monochloro maleic anhydride, the temperature is preferably maintained in the neighborhood of 130–160° C. In this temperature range dihalo succinic anhydride is formed by the addition of halogen to the double bond of the maleic anhydride, and simultaneously the dihalo succinic anhydride loses hydrogen halide, and monohalo maleic anhydride is obtained as the dominant product. At temperatures higher than the range indicated the amount of undesirable by-products increases while at lower temperatures the loss of hydrogen halide from the dihalo succinic anhydride is neither so rapid nor so complete as when the higher temperature is employed. The progress of the reaction may be followed by noting the increase in weight of the reaction mixture or by following the change in its density. The reaction is stopped when the weight increase reaches the calculated value or when the density is that of the monohalo maleic anhydride.

The halogenation may be carried out at temperatures lower than the range mentioned above with a corresponding increase in the amount of dihalo succinic anhydride in the final product. This material may be isolated as such or the crude mixture may then be heated above 130° C. to split out hydrogen halide and form the monohalo maleic anhydride.

Irradiation of the reacting mixture with ultraviolet light appears to be advantageous in the preparation of the monohalo maleic anhydride by facilitating the removal of hydrogen halide from the intermediate dihalo succinic anhydride. With the use of ultraviolet light the halogen produces monohalo maleic anhydride without heating above 110° C. at any time.

The following examples illustrate the invention:

1. A mixture of 300 parts of maleic anhydride and 6 parts of anhydrous aluminum chloride was maintained at 140–150° C. while gaseous chlorine was passed into the mixture with vigorous stirring. After twenty-one hours of reaction the gain in weight equalled that calculated for conversion to monochloro maleic anhydride, and the reaction was stopped. On distillation a good yield was obtained of chloro maleic anhydride with a boiling point of 111–114° C./50 mm.

$$D_{15°}^{27°} = 1.547$$

2. A mixture of 436 parts of maleic anhydride and 9 parts of anhydrous aluminum chloride was maintained at 100–110° C. while gaseous chlorine was passed into the mixture with vigorous stirring. After 25.6 hours of chlorination the procedure was varied to include alternate periods of chlorination at 100–110° C. and heating at 140–150° C. without chlorination. The reaction was judged complete after a total of thirty-eight hours of chlorination and fifteen hours of heating at 140–150° C. Distillation of the product gave a high yield of chloro maleic anhydride with a boiling point of 114–117° C./65 mm.

$$D_{15°}^{24°} = 1.547$$

3. A mixture of 200 parts of maleic anhydride and 4 parts of anhydrous aluminum chloride was heated at 75–110° C. in a reactor of fused quartz. The reaction vessel was irradiated by means of a 100-watt mercury vapor lamp at a distance of about 6 inches, and chlorine was passed into the molten mixture. The temperature was gradually increased from the lower limit during the course of the reaction. After thirty-two hours the gain in weight equalled that calculated for conversion to monochloro maleic anhydride, and the reaction was stopped. The reaction mass may be agitated. Distillation gave a good yield of chloro maleic anhydride with a boiling point of 120–125° C./43 mm.

$$D_{15°}^{27°} = 1.538$$

What we claim is:

1. The process of halogenating maleic anhydride which comprises passing a halogen gas into the same in a molten condition in the presence of aluminum halide distributed throughout the molten mass.

2. The process of converting maleic anhydride to dichloro succinic anhydride which comprises chlorinating a molten mass of maleic anhydride containing aluminum chloride as a catalyst at a temperature of at least about 75° C.

3. The process of converting maleic anhydride to a dihalo succinic anhydride which comprises passing a halogen gas into a molten mixture of maleic anhydride containing aluminum halide thoroughly dispersed therein and irradiating the reaction mixture during the halogenation.

4. The process of converting a dihalo succinic anhydride to the monohalo maleic anhydride which comprises heating the dihalo succinic anhydride in the presence of aluminum halide as a catalyst.

5. The process of converting dichloro succinic anhydride to monochloro maleic anhydride which comprises heating a molten mixture of dichloro succinic anhydride containing aluminum chloride dispersed therein to a temperature of about 130° C. to dehydrochlorinate the dichloro succinic anhydride.

6. The process of converting maleic anhydride to a dihalo succinic anhydride which comprises irradiating a molten mass of the maleic anhydride containing aluminum halide dispersed therein while bringing the reaction mixture into intimate contact with the halogen.

7. The process of converting dichloro succinic anhydride to monochloro maleic anhydride which comprises heating and irradiating a molten mass of dichloro succinic anhydride containing aluminum chloride dispersed therein so as to dehydrochlorinate the same.

8. The process of converting maleic anhydride into a monohalo maleic anhydride which comprises halogenating a molten mixture of the maleic anhydride and aluminum halide to produce a dihalo succinic anhydride, and dehydrohalogenating the resultant molten reaction mass while still containing the aluminum chloride to produce therefrom the monohalo maleic anhydride.

9. The process of converting maleic anhydride to monochloro maleic anhydride which comprises passing chlorine into a molten mass of maleic anhydride containing aluminum chloride as a catalyst to thereby produce dichloro succinic anhydride and maintaining the temperature of the maleic anhydride no higher than about 110° C. during the chlorination, and thereafter raising the temperature of the reacted mass to at least about 130° C. to thereby dehydrochlorinate the mass in the presence of the aluminum chloride.

10. The method of converting maleic anhydride into monochloro maleic anhydride which comprises bringing chlorine into intimate contact with a molten mass of maleic anhydride containing aluminum chloride dispersed therein while maintaining the mass at a temperature of at least about 130° C. to chlorinate maleic anhydride to form dichloro succinic anhydride and simultaneously dehydrochlorinate the dichloro succinic anhydride to produce monochloro maleic anhydride therefrom.

PAUL H. WISE.
CHARLES R. MILONE.